(12) United States Patent  
Yonekubo (10) Patent No.: US 11,360,374 B2  
(45) Date of Patent: Jun. 14, 2022

(54) LIGHT SOURCE DEVICE AND ELECTRONIC APPARATUS

(71) Applicant: SEIKO EPSON CORPORATION, Tokyo (JP)

(72) Inventor: Masatoshi Yonekubo, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/062,984

(22) Filed: Oct. 5, 2020

(65) Prior Publication Data

US 2021/0018823 A1 Jan. 21, 2021

Related U.S. Application Data

(63) Continuation of application No. 16/699,170, filed on Nov. 29, 2019, now Pat. No. 10,831,089.

(30) Foreign Application Priority Data

Nov. 30, 2018 (JP) .............................. JP2018-224981

(51) Int. Cl.
    *G03B 21/20* (2006.01)
    *G03B 21/28* (2006.01)

(52) U.S. Cl.
    CPC ........ *G03B 21/204* (2013.01); *G03B 21/2066* (2013.01); *G03B 21/28* (2013.01)

(58) Field of Classification Search
    CPC ... G03B 21/204; G03B 21/2066; G03B 21/28
    See application file for complete search history.

(56) References Cited

U.S. PATENT DOCUMENTS

| 7,540,616 B2 | 6/2009 | Conner |
| 8,545,032 B2 | 10/2013 | Chen et al. |

FOREIGN PATENT DOCUMENTS

| JP | 2016-521438 A | 7/2016 |
| JP | 2017-516267 A | 6/2017 |
| WO | 2014/155250 A1 | 10/2014 |
| WO | 2015/173026 A2 | 11/2015 |

*Primary Examiner* — Vip Patel (74) *Attorney, Agent, or Firm* — Oliff PLC (57) ABSTRACT

A light source device according to the present disclosure includes a light-emitting body configured to emit first wavelength range light, a dichroic film configured to be able to selectively transmit the first wavelength range light, a wavelength converter that includes an incident surface on which the first wavelength range light is incident, and an emission surface configured to convert the first wavelength range light to second wavelength range light and subsequently emit, and for which the incident surface is set to be larger than the emission surface, and a light collector including a light collecting part configured to collect the second wavelength range light, wherein the light-emitting body, the dichroic film, and the wavelength converter are subjected to direct bonding, in a state of being stacked in this order, in an emission direction of the first wavelength range light from the light-emitting body.

11 Claims, 6 Drawing Sheets

LIGHT SOURCE DEVICE AND ELECTRONIC APPARATUS

CROSS REFERENCE TO RELATED APPLICATION

This application is a Continuation of U.S. application Ser. No. 16/699,170, filed Nov. 29, 2019, the disclosure of which is hereby incorporated by reference herein in its entirety. The present application is based on and claims priority from JP Application Serial Number 2018-224981, filed Nov. 30, 2018, the disclosure of which is hereby incorporated by reference herein in its entirety.

BACKGROUND

1. Technical Field

The present disclosure relates to a light source device and an electronic apparatus.

2. Related Art

In recent years, lighting or light source devices having excellent energy efficiency are required to be developed in terms of energy saving or the like, and a light source device using a solid power source such as a light-emitting diode (LED) or a semiconductor laser (LD) has been proposed.

Here, when an LED is applied to a light source device included in a projector, for example, and large power is inputted into one LED to obtain large light flux enough to be usable for a projector by the one LED, light emission efficiency decreases due to a droop phenomenon. Thus, in this case, a method of expanding a light-emitting area of the light source device, such as increasing the number of LEDs included in the light source device is generally adopted.

However, efficiency of illuminating a display device such as a liquid crystal or a digital mirror device (DMD) in a projector is increased as entendu=light-emitting area×solid angle is set to be smaller. As a result, when achievement of high brightness of a projector is attempted with a plurality of LEDs, there has been a problem to face with a dilemma caused by expansion of light flux due to enlargement of the light-emitting area, and a decrease in illumination efficiency due to an increase in the etendue.

As a means to solve this problem, a technology referred to as so-called HLD (High Lumen Density) that realizes high brightness without increasing the etendue is proposed in JP-T-2016-521438, for example, by using a principle of fluorescent focusing that applies fluorescence conversion to light emitted by a plurality of LEDs and focuses the light applied with the fluorescence conversion into a small area.

However, in this HLD technology, due to low extraction efficiency of extracting the light applied with the fluorescence conversion, energy efficiency lowers, and as a result, there has been a problem that, for example, power consumed by a lighting device increases, and a cooling mechanism for cooling generated heat needs to be provided, thereby leading to an increase in size of the lighting device.

SUMMARY

The disclosure is made to address the above-described issues, and can be realized as the following application examples.

A light source device according to an application example of the present disclosure includes a light-emitting body configured to emit first wavelength range light, a dichroic film configured to be able to selectively transmit the first wavelength range light, a wavelength converter that includes an incident surface on which the first wavelength range light is incident, and an emission surface configured to convert the first wavelength range light to second wavelength range light and subsequently emit, and for which the incident surface is set to be larger than the emission surface, and a light collector including a light collecting part configured to collect the second wavelength range light, wherein the light-emitting body, the dichroic film, and the wavelength converter are subjected to direct bonding, in a state of being stacked in this order, in an emission direction of the first wavelength range light from the light-emitting body.

DESCRIPTION OF EXEMPLARY EMBODIMENTS

A light source device and an electronic apparatus according to an aspect of the present disclosure will be described in detail below based on preferable exemplary embodiments illustrated in the accompanying drawings.

Light Source Device

First Exemplary Embodiment

Figure 1:
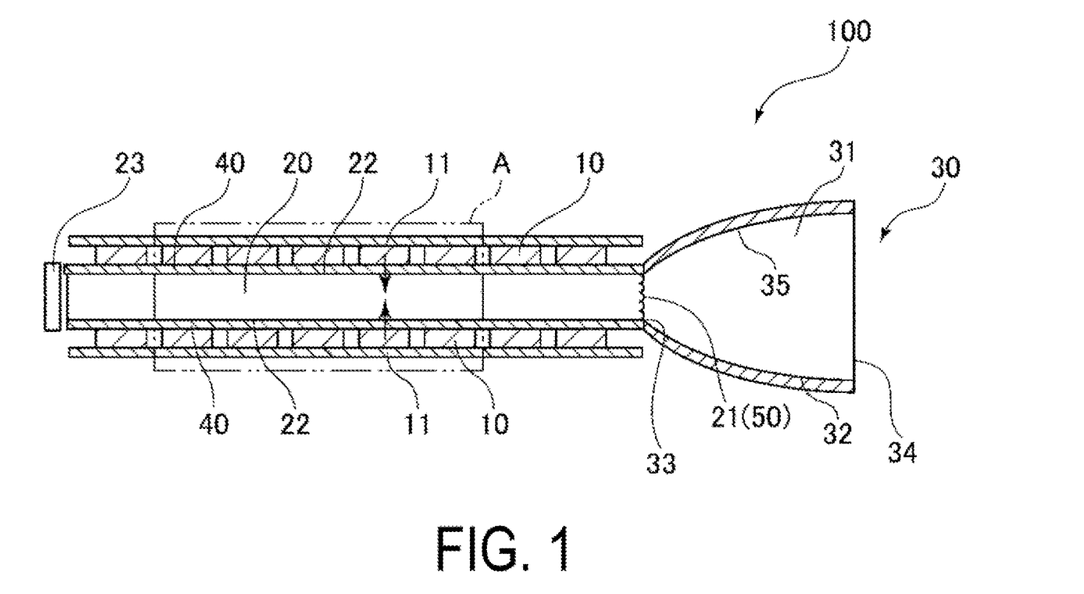
FIG. 1 is a cross-sectional view schematically illustrating a light source device according to a first exemplary embodiment of the present disclosure.
Figure 2:
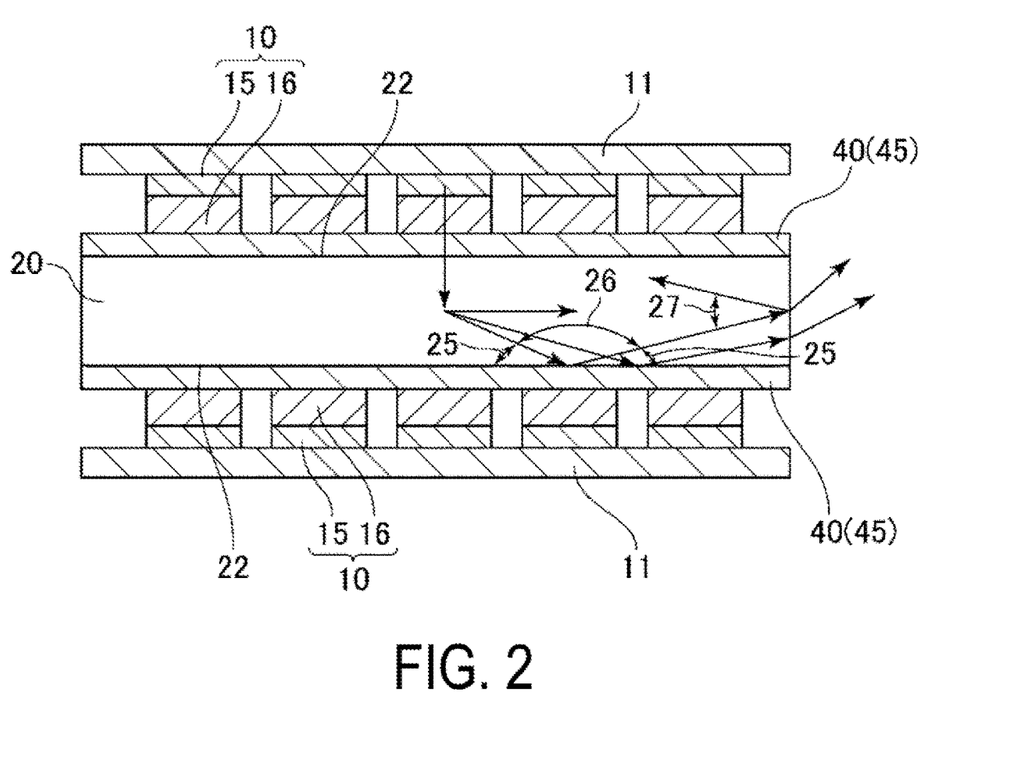
FIG. 2 is an enlarged cross-sectional view enlarging and illustrating a configuration of a part A of the light source device illustrated in FIG. 1.
Figure 3:
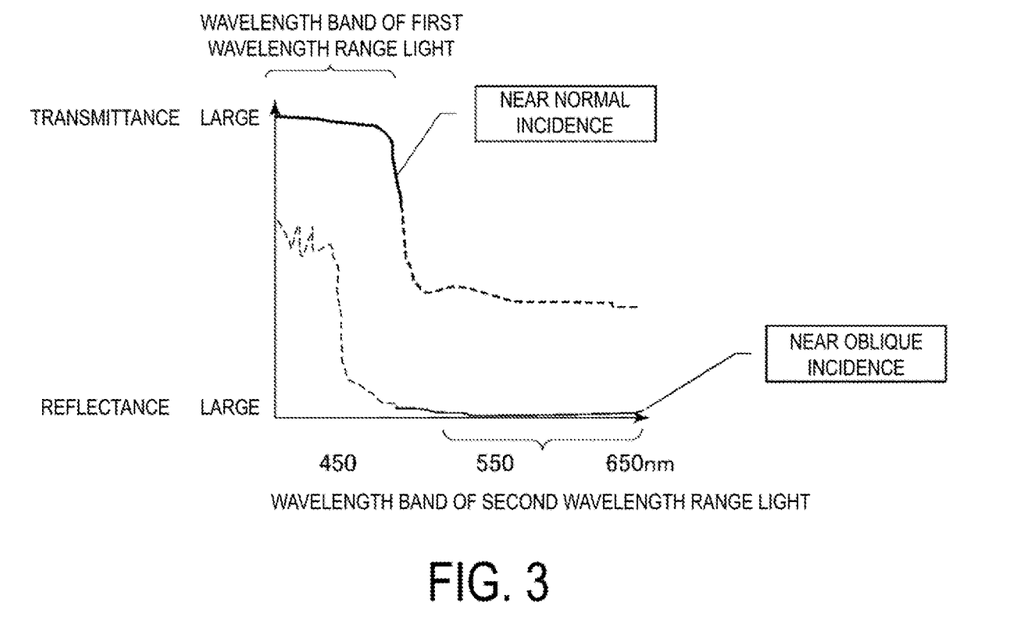
FIG. 3 is a graph showing transmittance characteristics of a dichroic film in each wavelength range.

FIG. 1 is a cross-sectional view schematically illustrating a light source device according to a first exemplary embodiment of the present disclosure, FIG. 2 is an enlarged cross-sectional view enlarging and illustrating a configuration of a part A of the light source device illustrated in FIG. 1, and FIG. 3 is a graph showing transmittance characteristics of a dichroic film in each wavelength range. Note that, in the following, for convenience of explanation, an upper side in each of FIG. 1 and FIG. 2 is described as a "top", a lower side as a "bottom", a left side as a "base end", and a right side as a "tip".

A light source device 100 is a device to which a technology referred to as so-called HLD (High Lumen Density) is applied that realizes high brightness without increasing etendue, by using a principle of fluorescent focusing that applies fluorescence conversion to light emitted by a light-emitting body 10 such as a plurality of LEDs and focuses the light applied with the fluorescence conversion into a small area.

In the present exemplary embodiment, as illustrated in FIG. 1 and FIG. 2, the light source device 100 includes a plurality of the light-emitting bodies 10 that emit first wavelength range light, a wavelength converter 20 that converts the first wavelength range light into second wavelength range light, a dichroic film 40 that can selectively transmit the first wavelength range light, and a light collector 30 that includes a light collecting part 33 that focuses the second wavelength range light.

In the light source device 100, the light-emitting body 10, the dichroic film 40, and the wavelength converter 20 are stacked in this order in an emission direction of the first wavelength range light from the light-emitting body 10, and are directly bonded. In other words, the light source device 100 includes the dichroic film 40 provided between the light-emitting body 10 and the wavelength converter 20, so as to come in contact with the light-emitting body 10 and with the wavelength converter 20. The dichroic film 40 can selectively transmit the first wavelength range light, and transmittance of the first wavelength range light is higher than transmittance of the second wavelength range light. Thus, the first wavelength range light emitted by the plurality of light-emitting bodies 10 can be reliably entered or introduced into the wavelength converter 20 from the incident surface 22 via the dichroic film 40. Then, the second wavelength range light converted by the first wavelength range light in the wavelength converter 20 can be reliably reflected by the dichroic film 40 at the incident surface 22 of the wavelength converter 20. Accordingly, a larger amount of the second wavelength range light can be extracted from the emission surface 21 of the wavelength converter 20 into the light collecting part 33, that is, extraction efficiency of the second wavelength range light from the wavelength converter 20 to the light collecting part 33 can be improved. Thus, an object to be irradiated can be irradiated with this second wavelength range light from the light collector 30 with excellent extraction efficiency.

Hereinafter, a configuration of each part included in the light source device 100 will be described sequentially.

Light-emitting body 10

The light-emitting body 10 is a light source in the light source device 100, and in the present disclosure, emits the first wavelength range light and emits the light toward the dichroic film 40 and the wavelength converter 20.

The plurality of light-emitting bodies 10 are mounted on a circuit board 11 included in the light source device 100. In other words, in the present exemplary embodiment, eight number of the bodies 10 are mounted on each of a pair of the circuit boards 11 arranged to face each other in a vertical direction via the wavelength converter 20, and the light source device 100 includes a total of 16 number of the illuminants 10. Accordingly, the first wavelength range light emitted by the light-emitting body 10 is radiated to an upper portion and a lower portion of the wavelength converter 20.

Examples of the light-emitting body 10 include, for example, a solid power source such as a light-emitting diode (LED), a semiconductor laser (LD), or an organic EL element (OLED), and one or two or more types of these can be used in combination, but among these, the LED may be used. The LED can emit light having a desired first wavelength range with relatively high efficiency, thus may be used as the light-emitting body 10.

Examples of the first wavelength range include, a case of emitting light in a UV or violet color gamut defined as a wavelength window less than 420 nm, a case of emitting light in a blue color gamut defined as a wavelength window equal to or more than 420 nm and equal to or less than 495 nm, a case of emitting light in a green/yellow color gamut defined as a wavelength window equal to or more than 495 nm and equal to or less than 600 nm, a case of emitting light in a red color gamut defined as a wavelength window equal to or more than 600 nm and equal to or less than 800 nm, a case of emitting light in a near-infrared range defined as a wavelength window equal to or more than 810 nm and equal to or less than 850 nm, and the like, and depending on the above wavelength windows, light sources such as LEDs that emit various colors are selected and used as the light-emitting body 10.

Note that, since the LD, currently and widely used, is an end face emission type, for example, when this is used as a light source of a projector, after light of a plurality of LDs is combined and homogenized with an optical system, a display device such as an LCD or a DMD needs to be illuminated as a face. Compared to this, by using the LD as the light-emitting body 10, the LD can be used as the light source for the projector without using the optical system.

Additionally, the OLED is a light source that is easy to be increased in area. Thus, by using the OLED as the light-emitting body 10, as illustrated in FIG. 1, it is not necessary to provide eight number of the bodies 10 on one number of the circuit board 11, for example, and one number of the light-emitting body 10 may be used as a light source that emits the first wavelength range light to the wavelength converter 20.

In the present exemplary embodiment, as illustrated in FIG. 2, the light-emitting body 10 as described above includes a substrate 16 and a light-emitting element 15 disposed on the substrate 16. Additionally, the circuit board 11 is mounted with the light-emitting element 15, and the light-emitting body 10 is bonded to the dichroic film 40 in a state where the substrate 16 stacked on this light-emitting element 15 comes in contact with the dichroic film 40. Furthermore, the substrate 16 has optical transparency. In the light-emitting body 10 having the above configuration, the substrate 16 constitutes an emission surface for emitting the first wavelength range light emitted by the light-emitting element 15.

When the light-emitting body 10 including the above substrate 16 and the light-emitting element 15 is applied to an LED, examples of the substrate 16 include, for example, a sapphire substrate, a silicon substrate, and the like, and examples of the light-emitting element 15 include, for example, a GaN-based light-emitting element and the like.

In addition, in this case, the substrate 16 may further include other layers such as a protective layer and a coating layer, in addition to a sapphire substrate and a silicon substrate. The light-emitting element 15 may include other layers such as a protective layer and an intermediate layer, in addition to a p-type GaN layer, a light-emitting layer, an n-type GaN layer, and an electrode.

Wavelength Converter 20

The wavelength converter 20 includes the incident surface 22 on which the first wavelength range light is incident, and the emission surface 21 that emits the second wavelength range light. The wavelength converter 20 functions as a wavelength conversion element for converting the first wavelength range light emitted from the light-emitting body 10 and passing through the dichroic film 40 to the second wavelength range light, and also functions as an optical waveguide for guiding the first wavelength range light incident from the incident surface 22 to the emission surface 21.

In this wavelength converter 20, when the incident surface 22 on which the first wavelength range light is incident is compared to the emission surface 21 that converts the first wavelength range light to the second wavelength range light, and subsequently emits, the incident surface 22 is set to be larger than the emission surface 21. In other words, a total area S1 of the incident surface 22 and a total area S2 of the emission surface 21 may satisfy a relationship S1>S2, and S1>2×S2. When a relationship between a size of the incident surface 22 on which the first wavelength range light is incident, and a size of the emission surface 21 that emits the second wavelength range light satisfy the above described relationship, the second wavelength range light converted from the first wavelength range light can be emitted from the emission surface 21, by setting etendue (=light-emission area×solid angle) to be set small rather than increasing. Thus, extraction efficiency of light in the light source device 100 can be improved.

The above wavelength converter 20 is, in order for the size of the incident surface 22 to be larger than the size of the emission surface 21, constituted by a light guide having transparency, such that an overall shape forms a rodlike long object, for example, and light can transmit inside thereof. Then, the wavelength converter 20 contains a luminescent material such that conversion of the first wavelength range light to the second wavelength range light can be achieved, by irradiation with the first wavelength range light to emit the second wavelength range light.

In the wavelength converter 20, a ratio of a length of the incident surface 22 (length in a left-right direction in FIG. 1) to a height of the emission surface 21 (length in an up-down direction in FIG. 1), as illustrated in FIG. 1, may satisfy approximately, 2:1 to 10:1, more preferably satisfies approximately, 3:1 to 7:1. This makes it possible to more reliably prevent an increase in the etendue. In addition, a shape in plan view of the emission surface 21 is not particularly limited, but examples include, for example, a circular shape such as a true circular shape or an elliptical shape, or a polygonal shape such as a triangle, a square, a rectangle, a pentagon, or a hexagon.

A main material constituting the wavelength converter 20 is not particularly limited as long as the main material has transparency, but examples include, for example, an undoped transparent garnet such as YAG and LuAG, and a polymeric material having optical transparency, in addition to glass such as borosilicate glass, and quartz, sapphire, and polycrystalline alumina, and one or two or more of the above materials can be used in combination. By appropriately combining the above materials, the wavelength converter 20 having a refractive index n approximately equal to or more than 1.5 and equal to or less than 1.8 can be obtained, and it is possible to set the refractive index larger than that of an inner part 31 of the light collector 30.

Furthermore, examples of the luminescent material included in the wavelength converter 20 include, for example, organic fluorescent materials, in addition to inorganic phosphors such as doped YAG, LuAG, and the like, such as yellow-emitting YAG:Ce (cerium-doped yttrium aluminum garnet) and green-emitting LuAG:Ce (cerium-doped lutetium aluminum garnet). By selecting the luminescent material, a scope of a second wavelength range of light emitted by irradiation with the first wavelength range light can be set. In other words, a color tone of light emitted from the emission surface 21 of the wavelength converter 20 can be set.

The first wavelength range light emitted from the plurality of bodies 10 enters, into the wavelength converter 20 having the above configuration, and the luminescent material included in the wavelength converter 20 makes the light converted to the second wavelength range luminous. At this time, the second wavelength range light made to be luminous by the luminescent material is radiated in all directions in the wavelength converter 20. Then, as illustrated in FIG. 2, of light that reaches the incident surface 22, light incident at an angle in a transmission angle range 26 passes through the incident surface 22, is emitted outward the wavelength converter 20, and light incident at an angle in a total reflection angle range 25 is totally reflected at the incident surface 22. Thereafter, when it is assumed that the emission surface 21 is constituted by a planar surface, of the light totally reflected, light incident on the emission surface 21 at an angle in a light guide angle range 27 passes through the emission surface 21 and is emitted inward the light collector 30.

Additionally, the light source device 100 includes a mirror 23 outside an end surface of the rodlike wavelength converter 20 opposite to the emission surface 21. In this way, of the second wavelength range light made to be luminous by the luminescent material contained in the wavelength converter 20, light emitted from the end surface opposite to the emission surface 21 can be reflected by the mirror 23 to be introduced into the wavelength converter 20 again. Note that, as illustrated in FIG. 1, the mirror 23 may be provided separately from the wavelength converter 20, or may be formed integrally with the wavelength converter 20.

Furthermore, the light source device 100 may include a mirror (not illustrated) outside a side surface different from the incident surface 22 of the rodlike wavelength converter 20. Accordingly, of the second wavelength range light made to be luminous by the luminescent material contained in the wavelength converter 20, light emitted from a side surface different from the incident surface 22 can be reflected by the mirror to be introduced into the wavelength converter 20 again. Note that, the mirror may be provided separately from the wavelength converter 20, or may be formed integrally with the wavelength converter 20.

Dichroic Film 40

The dichroic film 40 can selectively transmit the first wavelength range light. In other words, transmittance of the light in first wavelength range light is higher than transmittance of the second wavelength range light.

In the present exemplary embodiment, the dichroic film 40 is provided between the light-emitting body 10 and the wavelength converter 20, so as to come in contact with both the substrate 16, which is the emission surface of the light-emitting body 10, and the incident surface 22 of the wavelength converter 20.

Thus, the first wavelength range light emitted by the plurality of bodies 10 can be reliably incident on or introduced to the wavelength converter 20 via the dichroic film 40. Further, as described above, of the second wavelength range light converted by the first wavelength range light in the wavelength converter 20, light incident at the angle in the transmission angle range 26 passes through the incident surface 22 and is emitted outward the wavelength converter 20, but the light passing through this incident surface 22 can also be reliably reflected by the dichroic film 40. Thus, the extraction efficiency of the second wavelength range light from the emission surface 21 of the wavelength converter 20 to the light collecting part 33 can be improved.

The dichroic film 40 (i.e. dielectric multilayer film) is constituted by a laminate containing an inorganic material as a main material, formed by stacking a high refractive index film 90 having a relatively high refractive index and a low refractive index film 92 having a relatively low refractive index in a thickness direction.

Examples of inorganic materials included in the high refractive index film and the low refractive index film include $Al_2O_3$ (n=1.63), $CeO_2$ (n=2.0), $Cr_2O_3$ (n=2.55), $HfO_2$ (n=1.95), $La_2O_3$ (n=1.9), MgO (n=1.74), $Nb_2O_3$ (n=2.3), NiO (n=–), $SiO_2$ (n=1.46), $Ta_2O_5$ (n=2.1), $TiO_2$ (n=2.3 to 2.55), $Ti_3O_5$ (n=2.3 to 2.55), $Y_2O_3$ (n=1.87), $WO_3$ (n=–), ZnO (n=2.1), $ZrO_2$ (n=2.05), $ZrO_2+TiO_2$ (n=2.1), $AlF_3$ (n=1.38), $CaF_2$ (n=1.23 to 1.45), $CeF_3$ (n=1.63), $GdF_3$ (n=1.59), $LaF_3$ (n=1.59), LiF (n=1.3), $MgF_2$ (n=1.38 to 1.4), NaF (n=1.29 to 1.3), $NdF_3$ (n=1.61), $YF_3$ (n=1.5), ZnS (n=2.3 to 2.4), and the like, and combinations of one or two or more of the above-described materials are appropriately selected such that the high refractive index film has a relatively higher refractive index than that of the low refractive index film. Specifically, a combination in which the high refractive index film is constituted by $TiO_2$ (n=2.3 to 2.55) and the low refractive index film is constituted by $SiO_2$ (n=1.46), and the like may be cited.

In addition, a thickness of each film constituted by the high refractive index film or the low refractive index film may be set to, for example, about equal to or more than 50 nm and equal to or less than 500 nm, and more preferably about equal to or more than 100 nm and equal to or less than 250 nm.

Furthermore, in the laminate in which the high refractive index film and the low refractive index film are alternately stacked, the number of layers of each of the high refractive index film and the low refractive index film may be set to, for example, about 5 or more and 100 or less, and more preferably about 10 or more and 50 or less.

By setting the respective thicknesses and the numbers of stacked layers of the high refractive index film and the low refractive index film within the ranges described above, properties can be reliably imparted to the laminate as the dichroic film 40 in which the transmittance of the first wavelength range light is higher than the transmittance of the second wavelength range light.

Here, as the dichroic film 40 constituted by the laminate having the above configuration, a dichroic film that has a characteristic for which the transmittance of the first wavelength range light is higher than the transmittance of the second wavelength range light, in other words, a dichroic film that has a characteristic for which reflectance of the second wavelength range light is higher than reflectance of the first wavelength range light, is selected, but the above characteristics of the dichroic films 40 vary depending on an incident angle at which light is incident. In other words, transmission characteristics of light near normal incidence included in the transmission angle range 26 at which light passes through the incident face 22, and transmission characteristics of light near oblique incidence included in the total reflection angle range 25 at which light is totally reflected by the incident surface 22 are different from each other, rather than identical, in the dichroic film 40. Thus, as illustrated in FIG. 3, as the dichroic film 40, a dichroic film may be selected for which the transmittance of the first wavelength range light is large near the normal incidence included in the transmission angle range 26 at which light passes through the incident face 22, and the reflectance of the second wavelength range light is large near the oblique incidence included in the total reflection angle range 25 at which light is totally reflected by the incident surface 22.

Note that, the dichroic film 40 having the above characteristics can be obtained by appropriately setting the constituent materials included in the high refractive index film and the low refractive index film described above, the respective numbers of layers of the high refractive index film and the low refractive index film, respective film thicknesses of the high refractive index film and the low refractive index film, and the like.

The dichroic film 40 having the above configuration is, in the present exemplary embodiment, constituted by a planar film 45 or a solid film provided so as to cover substantially an entirety of the incident surface 22 of the wavelength converter 20, and is directly bonded to the emission surface of the light-emitting body 10, that is, the substrate 16.

The dichroic film 40 can be obtained by forming a laminate in which a high refractive index film and a low refractive index film are alternately stacked using, for example, chemical vapor deposition methods (CVD) such as plasma CVD, heat CVD, and laser CVD, dry plating methods such as vacuum deposition, sputtering, and ion plating, a vapor phase deposition method such as a thermal spraying method, or the like, on the incident surface 22 of the wavelength converter 20, and then directly bonding the laminate to the light-emitting body 10.

Further, the dichroic film 40 and the emission surface of the light-emitting body 10 or the substrate 16 may be directly bonded without a bonding layer interposed therebetween, but may be directly bonded via a bonding layer. Furthermore, in the latter case, the bonding layer is formed of the inorganic material cited as the constituent material of the dichroic film 40 such as $SiO_2$, but it is sufficient that a thickness of the bonding layer at this time is equal to or less than two wavelengths of a peak wavelength of the first wavelength range light. However, the thickness may be equal to or less than one wavelength, and more preferably equal to or less than a quarter wavelength. Accordingly, this bonding layer makes it possible to adequately suppress or prevent total reflection of the first wavelength range light. Thus, even when such a bonding layer is formed by direct bonding, the first wavelength range light emitted by the light-emitting body 10 can be reliably introduced into the wavelength converter 20.

Note that, when both an outermost layer of the laminate constituting the dichroic film 40 and this bonding layer are constituted by an identical material as in a case of $SiO_2$, the thickness of the bonding layer may be set to be equal to or less than one wavelength, and more preferably equal to or less than a quarter wavelength, with a thickness of this outermost layer also added.

Light Collector 30

The light collector 30 collects the second wavelength range light emitted from the emission surface 21 of the wavelength converter 20, and emits or radiates this second wavelength range light to an object to be irradiated by the light source device 100.

In the present exemplary embodiment, as illustrated in FIG. 1, the light collector 30 includes a main body 32 with an entire shape thereof forming a cylindrical shape, an open surface on a base end side constitutes the light collecting part 33, an open surface on a tip side constitutes a releasing part 34 for emitting or radiating the second wavelength range light, and an inner circumferential surface of the main body 32 having the inner part 31 constituting an internal space, is provided with a reflective layer 35 for reflecting the second wavelength range light collected by the light collecting part 33. In other words, the light collector 30 forms reflector structure constituted by the main body 32 and the reflective layer 35.

The light collector 30 having the above configuration is disposed such that the light collecting part 33 that is the open surface on the base end side of the light collector 30 corresponds to the emission surface 21 included in the wavelength converter 20. Accordingly, the second wavelength range light emitted from the emission surface 21 of the wavelength converter 20 is guided from the light collecting part 33 to the inner part 31 of the main body 32.

The main body 32 has a shape in which an inner diameter thereof gradually increases as a distance from a base end toward a tip increases, that is, from the light collecting part 33 toward the releasing part 34. In other words, the inner circumferential surface of the main body 32 is constituted by a curved surface that forms a funnel shape, that is, an inclined surface that forms a tapered shape. Additionally, the reflective layer 35 is formed on the inner circumferential surface of the main body 32.

Thus, by reflecting the second wavelength range light emitted from the emission surface 21 of the wavelength converter 20, which is introduced into the inner part 31 of the main body 32 via the light collecting part 33, by the reflective layer 35 toward the releasing part 34, and after this reflection, it is possible to release or radiate the light to a target object located outside the light source device 100, from the releasing part 34. Thus, a radiation angle of the second wavelength range light released from the releasing part 34 can be narrowed.

Note that, when a shape in plan view of the emission surface 21 of the wavelength converter 20 forms a circle, the main body 32 may be constituted by a composite parabola type heat collector (CPC: Compound Parabolic Concentrator). This makes it possible to more reliably narrow the radiation angle of the second wavelength range light emitted from the releasing part 34. In addition, when the shape in plan view of the emission surface 21 forms a circle, the emission surface 21 may be disposed on the light collecting part 33, that is, the open surface on the base end side of the light collector 30 such that an edge portion of the emission surface 21 coincides with a focal position of the CPC. With this, the above-mentioned effect can be exerted more prominently.

A constituent material of the main body 32 is not particularly limited, but, for example, identical materials to those listed as the main material constituting the wavelength converter 20 can be used. Among others, a material having a low coefficient of thermal expansion such as quartz or borosilicate glass may be used. Accordingly, even when the main body 32 is heated by the second wavelength range light reflected on the reflective layer 35, deformation of the main body 32 due to this heating can be adequately suppressed or prevented.

Note that, when such a constituent material is used, the main body portion 32 can be made to have transparency. Thus, as illustrated in FIG. 1, the reflective layer 35 may be formed on an outer circumferential surface of the main body 32, rather than being formed on the inner circumferential surface of the main body 32.

In addition, the reflective layer 35 can be constituted by a metal mirror containing a metal material such as Ag or Al as a main material, or a dielectric multilayer film mirror, for example.

Furthermore, the above described reflective layer 35 may include a dielectric layer or the like on a topmost surface as a protective layer.

Furthermore, in the present exemplary embodiment, the case where the inner part 31 is constituted by the internal space, that is, air is present as a filler in the inner part 31, but the present exemplary embodiment is not limited to such a configuration, and the inner part 31 may be filled with a filler with optical transparency other than air.

When air is present in the inner part 31, a refractive index (n) of the inner part 31 is set to 1.0, but including this case, it is sufficient that the refractive index of the inner part 31 is smaller than that of the wavelength converter 20. Specifically, the refractive index may be equal to or more than 1.0 and equal to or less than 1.4, and more preferably, equal to or more than 1.1 and equal to or less than 1.3. Accordingly, the extraction efficiency of light in the light source device 100 can be further improved.

Furthermore, a constituent material of the filler is not particularly limited as long as the material has optical transparency, but, for example, examples include aerogel (n=1.01 to 1.10), a polymeric material (n=around 1.3) such as Teflon (n=1.29, registered trademark), water (n=1.33), and the like, and one or two or more of these can be used in combination.

Furthermore, when the inner part 31 of the light collector 30 is filled with such a filler, and the filler is a solid material with a moderate strength, the light collector 30 may have a configuration in which formation of the main body 32 is omitted.

Also, when the open surface on the tip side or the releasing part 34 is sealed and air is present in the inner part 31, the inner part 31 may be in a state with reduced pressure or in a vacuum state.

Scattering Part 50

A scattering part 50 is disposed on the emission surface 21 of the wavelength converter 20 or closer to the light collector 30 than the emission face 21, and improves scattering properties or diffusion properties of the second wavelength range light. Accordingly, it is possible to improve the extraction efficiency of the second wavelength range light from within the wavelength converter 20 to an outside thereof via the emission surface 21.

In the present exemplary embodiment, as illustrated in FIG. 1, the scattering part 50 is integrally formed with the wavelength converter 20, and an upper surface of the emission surface 21, that is, the emission surface 21 itself constitutes the scattering part 50.

In this case, the scattering part 50 or the emission surface 21 is constituted by, for example, a micro lens, a lenticular lens, a prism, a scattering bead layer, diffraction grating, random recesses and protrusions, and the like. Accordingly, the second wavelength range light reaching the emission surface 21 within the wavelength converter 20 can be diffused, and as a result, the extraction efficiency of the second wavelength range light from the wavelength converter 20 is improved.

In addition, a degree of scattering the second wavelength range light at the scattering part 50 or the emission surface 21 can be defined, for example, by haze (a haze value; opacity), and haze measured in accordance with JIS K 7136 may be equal to or more than 5% and equal to or less than 85%, and more preferably equal to or more than 15% and equal to or less than 60%. By setting a haze size within the above ranges, extraction of the second wavelength range light from the wavelength converter 20 can be performed with more excellent efficiency.

In addition, as in the present exemplary embodiment, the scattering part 50 need not be formed integrally with the wavelength converter 20, but may be formed separately from the wavelength converter 20. In this case, it is sufficient that the scattering part 50 constituted by a micro lens, a lenticular lens, a prism, a scattering bead layer, diffraction grating, random recesses and protrusions, or the like is disposed, in a state in contact with the emission surface 21 constituted by a planar surface, or in a state of being separated toward the tip side for a micro distance, for example, with an intermediate layer interposed therebetween. In addition, respective refractive indice of the wavelength converter 20 and the scattering part 50 may have a difference, but may be approximately identical. Accordingly, the second wavelength range light can be handed over from the wavelength converter 20 to the scattering part 50 more smoothly.

According to the light source device 100 of the present exemplary embodiment as described above, particularly, the light source device 100 can be said to be a light source having excellent energy efficiency, because the dichroic film 40 is included, and thus the second wavelength range light can be extracted from the wavelength converter 20 included in the light source device 100 to the light collector 30 with high extraction efficiency. In addition, since it is not necessary to provide a cooling mechanism for cooling generated heat, the light source device 100 can be a light source for which miniaturization is realized.

Note that, in the present exemplary embodiment, the case where the light source device 100 includes the scattering part 50 has been described, but the light source device 100 may have a configuration in which the scattering part 50 is omitted. In other words, the emission surface 21 may also be constituted by a planar surface. However, by providing the light source device 100 with the scattering part 50, the second wavelength range light can be extracted from the wavelength converter 20 to the light collector 30 with higher extraction efficiency.

Second Exemplary Embodiment

Next, a second exemplary embodiment of the light source device of the present disclosure will be described.

Figure 4:
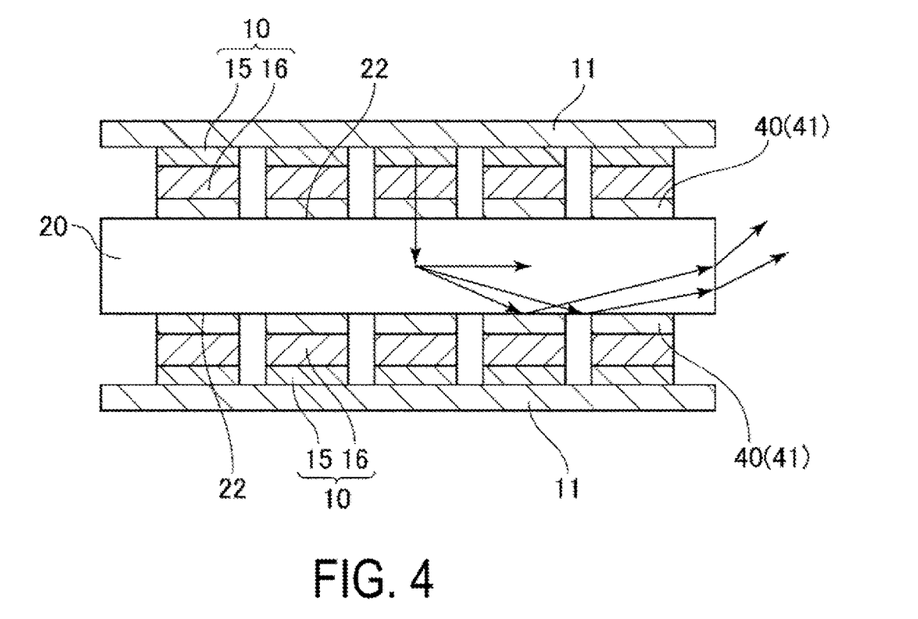
FIG. 4 is an enlarged cross-sectional view enlarging and illustrating a configuration of a part A of a light source device according to a second exemplary embodiment of the present disclosure.

FIG. 4 is an enlarged cross-sectional view enlarging and illustrating a configuration of a part A of a light source device according to a second exemplary embodiment of the present disclosure.

Hereinafter, differences between the light source device 100 according to the second exemplary embodiment and the light source device according to the first exemplary embodiment will be mainly described, and description on similar matters will be omitted.

The light source device 100 of the second exemplary embodiment is similar to the light source device of the first exemplary embodiment, except that a configuration of the dichroic film 40 provided in contact with both the light-emitting body 10 and the wavelength converter 20 is different.

In other words, in the light source device 100, when the light-emitting body 10 and the wavelength converter 20 are compared, the wavelength converter 20 is set to be larger in plan view as viewed from an emission direction of the first wavelength range light from the light-emitting body 10. In other words, the light-emitting body 10 is contained in the wavelength converter 20. In other words, the total area S1 of the incident surface 22 of the wavelength converter 20 and a total area S3 of the emission surface of the light-emitting body 10, that is, the substrate 16, are set to satisfy S1>S3. Additionally, in the present exemplary embodiment, as illustrated in FIG. 4, the dichroic film 40 is selectively formed between the light-emitting body 10 and the wavelength converter 20. In other words, in plan view of the wavelength converter 20, the dichroic film 40 is not formed in an area in which the light-emitting body 10 of the wavelength converter 20 is not disposed.

Thus, even when, as the dichroic film 40, a dichroic film having an absorption loss or scattering loss with respect to the second wavelength range light is formed, the dichroic film 40 is not formed in an area in which the light-emitting body 10 of the wavelength converter 20 is not disposed, and in this area, the second wavelength range light is totally reflected by the incident surface 22. Thus, the second wavelength range light can be reflected at high reflectance, as a whole, by the incident surface 22 of the wavelength converter 20.

The dichroic film 40 having the above configuration is, in the present exemplary embodiment, constituted by a patterned film 41 having an island shape provided so as to selectively cover a portion of the incident surface 22 of the wavelength converter 20, that is, a position corresponding to the light-emitting body 10, and is directly bonded to the incident surface 22 of the wavelength converter 20.

The dichroic film 40 can be obtained by forming a laminate in which a high refractive index film and a low refractive index film are alternately stacked using, for example, chemical vapor deposition methods (CVD) such as plasma CVD, heat CVD, and laser CVD, dry plating methods such as vacuum deposition, sputtering, and ion plating, a vapor phase deposition method such as a thermal spraying method, or the like, on the substrate 16 of the light-emitting body 10, and then directly bonding the laminate to the incident surface 22 of the wavelength converter 20.

The above-described light source device 100 according to the second exemplary embodiment can also provide benefit similar to that of the first exemplary embodiment.

Third Exemplary Embodiment

Next, a third exemplary embodiment of the light source device according to the present disclosure will be described.

Figure 5:
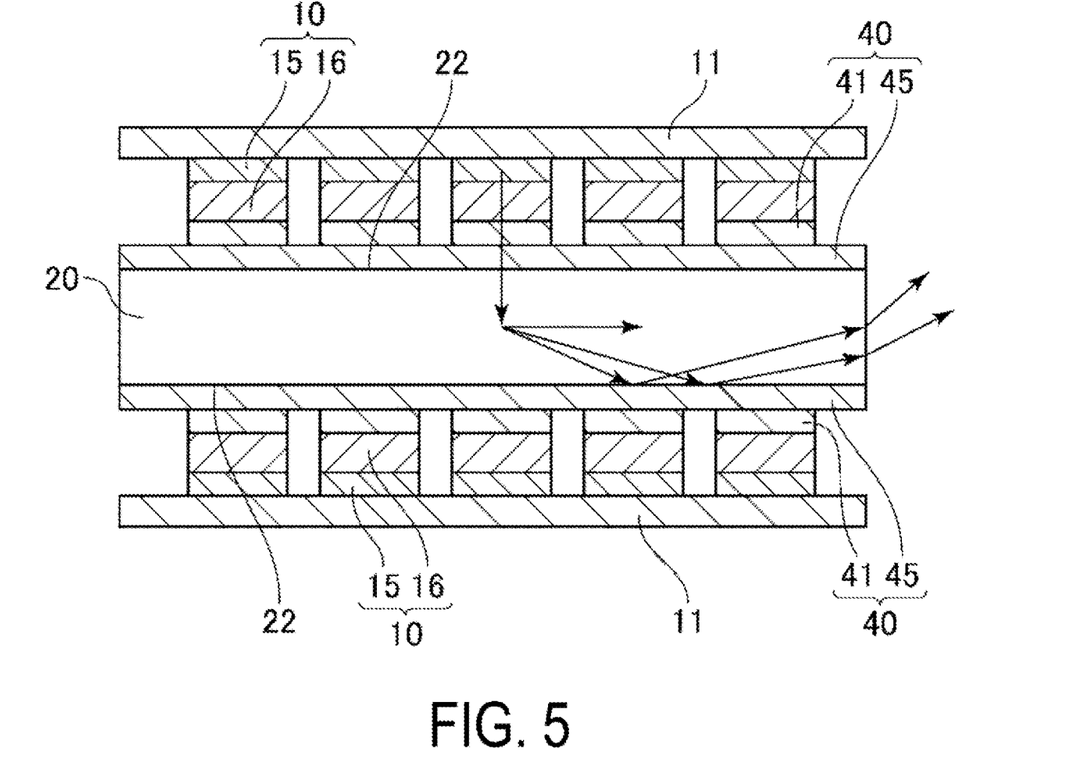
FIG. 5 is an enlarged cross-sectional view enlarging and illustrating a configuration of a part A of a light source device according to a third exemplary embodiment of the present disclosure.

FIG. 5 is an enlarged cross-sectional view enlarging and illustrating a configuration of a part A of a light source device according to the third exemplary embodiment of the present disclosure.

Hereinafter, differences between the light source device 100 according to the third exemplary embodiment and the light source device according to the first exemplary embodiment will be mainly described, and description on similar matters will be omitted.

The light source device 100 of the third exemplary embodiment is similar to the light source device of the first exemplary embodiment, except that a configuration of the dichroic film 40 provided in contact with both the light-emitting body 10 and the wavelength converter 20 is different.

In other words, in the light source device 100, when the light-emitting body 10 and the wavelength converter 20 are compared, the wavelength converter 20 is set to be larger in plan view as viewed from an emission direction of the first wavelength range light from the light-emitting body 10. In other words, the light-emitting body 10 is contained in the wavelength converter 20. In other words, the total area S1 of the incident surface 22 of the wavelength converter 20 and a total area S3 of the emission surface of the light-emitting body 10, that is, the substrate 16, are set to satisfy S1>S3. In the above-described light source device 100, in the present exemplary embodiment, as illustrated in FIG. 5, the dichroic film 40 is constituted, between the light-emitting body 10 and the wavelength converter 20, by a laminate of the patterned film 41 that is selectively formed and the planar film 45 provided so as to cover substantially an entirety of the incident surface 22 of the wavelength converter 20.

Accordingly, even when the dichroic film 40 is constituted by a laminate of, for example, high refractive index films and low refractive index films having a large number of layers, an increase in stress in the dichroic film 40 can be adequately suppressed or prevented. Thus, occurrence of peeling in the dichroic film 40 can be adequately suppressed or prevented.

The dichroic film 40 having the above configuration is, in the present exemplary embodiment, constituted by the laminate of the patterned film 41 having the island shape provided so as to cover the substrate 16 of the light-emitting body 10, and the planar film 45 provided so as to cover substantially the entirety of the incident surface 22 of the wavelength converter 20, and is directly bonded at a contact surface where the patterned film 41 and the planar film 45 come into contact.

The dichroic film 40 can be obtained, for example, by using chemical vapor deposition methods (CVD) such as, plasma CVD, heat CVD, and laser CVD, dry plating methods such as vacuum deposition, sputtering, and ion plating, a vapor phase deposition method such as a thermal spraying method, or the like, to form the patterned film 41 on the substrate 16 of the light-emitting body 10, and directly bonding the patterned film 41 and the planar film 45 after forming the planar film 45 on the incident surface 22 of the wavelength converter 20.

The above-described light source device 100 according to the third exemplary embodiment can also provide benefit similar to that of the first exemplary embodiment.

Fourth Exemplary Embodiment

Next, a fourth exemplary embodiment of the light source device according to the present disclosure will be described.

Figure 6:
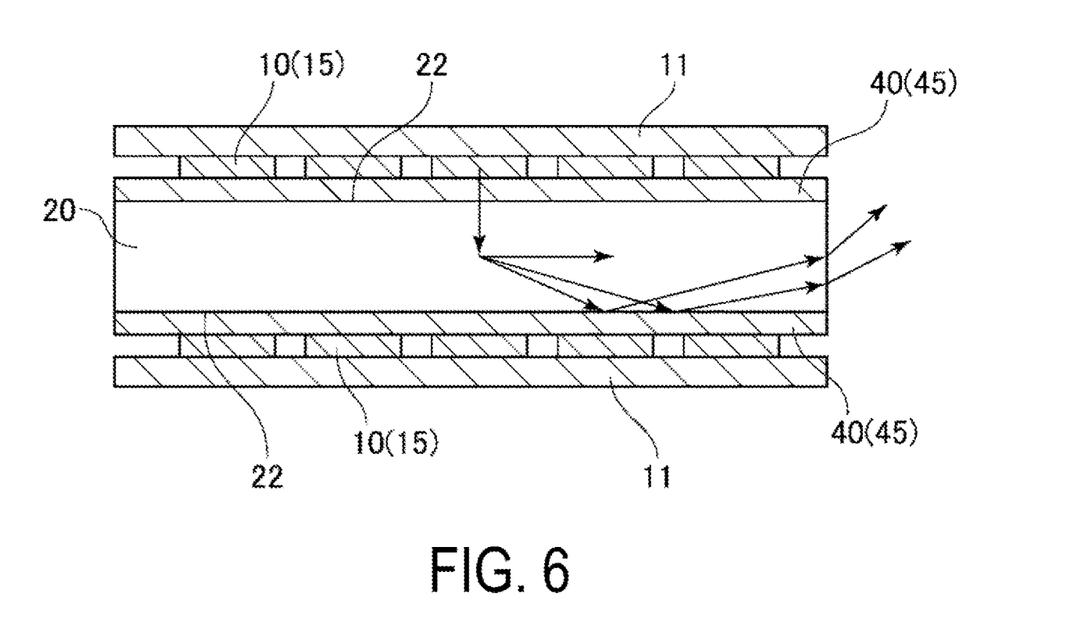
FIG. 6 is an enlarged cross-sectional view enlarging and illustrating a configuration of a part A of a light source device according to a fourth exemplary embodiment of the present disclosure.

FIG. 6 is an enlarged cross-sectional view enlarging and illustrating a configuration of a part A of a light source device according to the fourth exemplary embodiment of the present disclosure.

Hereinafter, differences between the light source device 100 according to the fourth exemplary embodiment and the light source device according to the first exemplary embodiment will be mainly described, and description on similar matters will be omitted.

The light source device 100 of the fourth exemplary embodiment is similar to the light source device of the above first exemplary embodiment except that a configuration of the light-emitting body 10 that emits the first wavelength range light is different.

That is, in the present exemplary embodiment, in the light source device 100, as illustrated in FIG. 6, the light-emitting body 10 does not include the substrate 16, and is constituted by the light-emitting element 15. The light-emitting body 10 is bonded to the dichroic film 40 with the light-emitting element 15 and the dichroic film 40 in contact with each other.

By omitting the substrate 16 in this manner, an interface between the substrate 16 and the light-emitting element 15 can be eliminated. Accordingly, a Fresnel reflection loss generated at this interface and an absorption loss of the substrate 16 can be eliminated, so incident efficiency of the first wavelength range light emitted by the light-emitting body 10 on the wavelength converter 20 is improved.

The light-emitting body 10 constituted by the light-emitting element 15 in this manner can be obtained, for example, as described in the first exemplary embodiment, by obtaining the laminate including the substrate 16 and the light-emitting element 15 mounted on the substrate 16, and then peeling the substrate 16 from the laminate.

The above-described light source device 100 according to the fourth exemplary embodiment can also provide benefit similar to that of the first exemplary embodiment.

Fifth Exemplary Embodiment

Next, a fifth exemplary embodiment of the light source device according to the present disclosure will be described.

Figure 7:
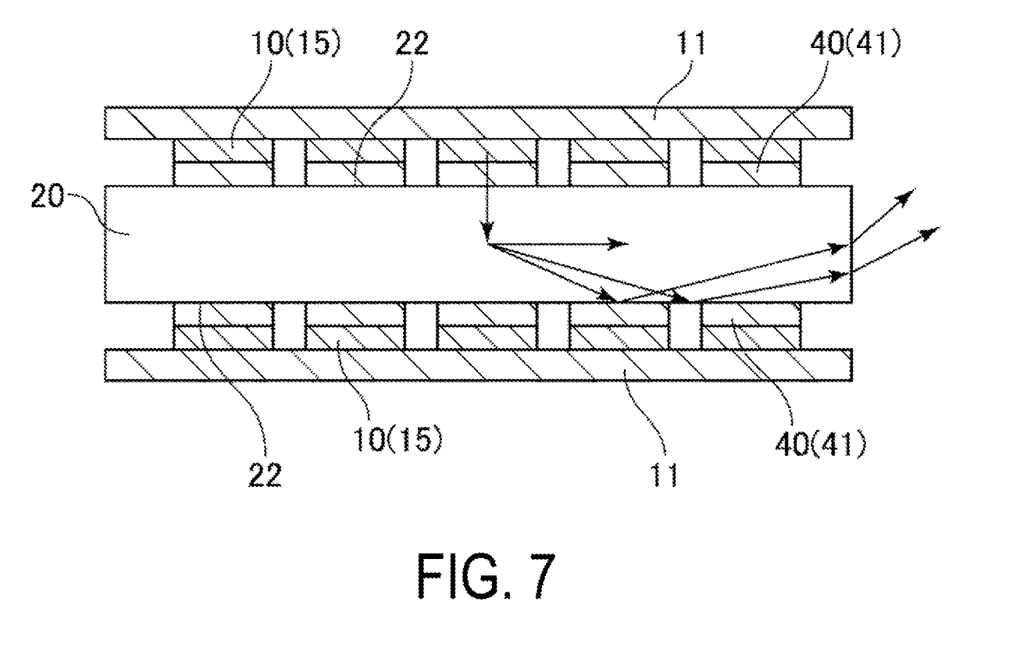
FIG. 7 is an enlarged cross-sectional view enlarging and illustrating a configuration of a part A of a light source device according to a fifth exemplary embodiment of the present disclosure.

FIG. 7 is an enlarged cross-sectional view enlarging and illustrating a configuration of a part A of a light source device according to the fifth exemplary embodiment of the present disclosure.

Hereinafter, differences between the light source device 100 according to the fifth exemplary embodiment and the light source device according to the fourth exemplary embodiment will be mainly described, and description on similar matters will be omitted.

The light source device 100 of the fifth exemplary embodiment is similar to the light source device of the fourth exemplary embodiment, except that a configuration of the dichroic film 40 provided in contact with both the light-emitting body 10 and the wavelength converter 20 is different.

In other words, in the light source device 100, when the light-emitting body 10 and the wavelength converter 20 are compared, the wavelength converter 20 is set to be larger in plan view as viewed from an emission direction of the first wavelength range light from the light-emitting body 10. In other words, the light-emitting body 10 is contained in the wavelength converter 20. In other words, the total area S1 of the incident surface 22 of the wavelength converter 20 and a total area S4 of the emission surface of the light-emitting body 10, that is, the light-emitting element 15, are set to satisfy S1>S4. Additionally, in the present exemplary embodiment, as illustrated in FIG. 7, the dichroic film 40 is selectively formed between the light-emitting body 10 and the wavelength converter 20. In other words, in plan view of the wavelength converter 20, the dichroic film 40 is not formed in an area in which the light-emitting body 10 of the wavelength converter 20 is not disposed.

Thus, even when, as the dichroic film 40, a dichroic film having an absorption loss or scattering loss with respect to the second wavelength range light is formed, the dichroic film 40 is not formed in an area in which the light-emitting body 10 of the wavelength converter 20 is not disposed, and in this area, the second wavelength range light is totally reflected by the incident surface 22. Thus, the second wavelength range light can be reflected at high reflectance, as a whole, by the incident surface 22 of the wavelength converter 20.

The dichroic film 40 having the above configuration is, in the present exemplary embodiment, constituted by a patterned film 41 having an island shape provided so as to selectively cover a portion of the incident surface 22 of the wavelength converter 20, that is, a position corresponding to the light-emitting body 10, and is directly bonded to the incident surface 22 of the wavelength converter 20.

The dichroic film 40 can be obtained by forming a laminate in which a high refractive index film and a low refractive index film are alternately stacked using, for example, chemical vapor deposition methods (CVD) such as plasma CVD, heat CVD, and laser CVD, dry plating methods such as vacuum deposition, sputtering, and ion plating, a vapor phase deposition method such as a thermal spraying method, or the like, on the light-emitting element 15 constituting the light-emitting body 10 with the substrate 16 omitted, and then directly bonding the laminate to the incident surface 22 of the wavelength converter 20.

The above-described light source device 100 according to the fifth exemplary embodiment can also provide benefit similar to those of the first exemplary embodiment and the fourth exemplary embodiment.

The above described light source device 100 can be incorporated as a light source included in various electronic apparatuses.

Liquid Crystal Projector

Hereinafter, as an example of the electronic apparatus of the present disclosure, a liquid crystal projector in which the light source device 100 is used in a light source that emits yellow light as the second wavelength range light will be described.

Figure 8:
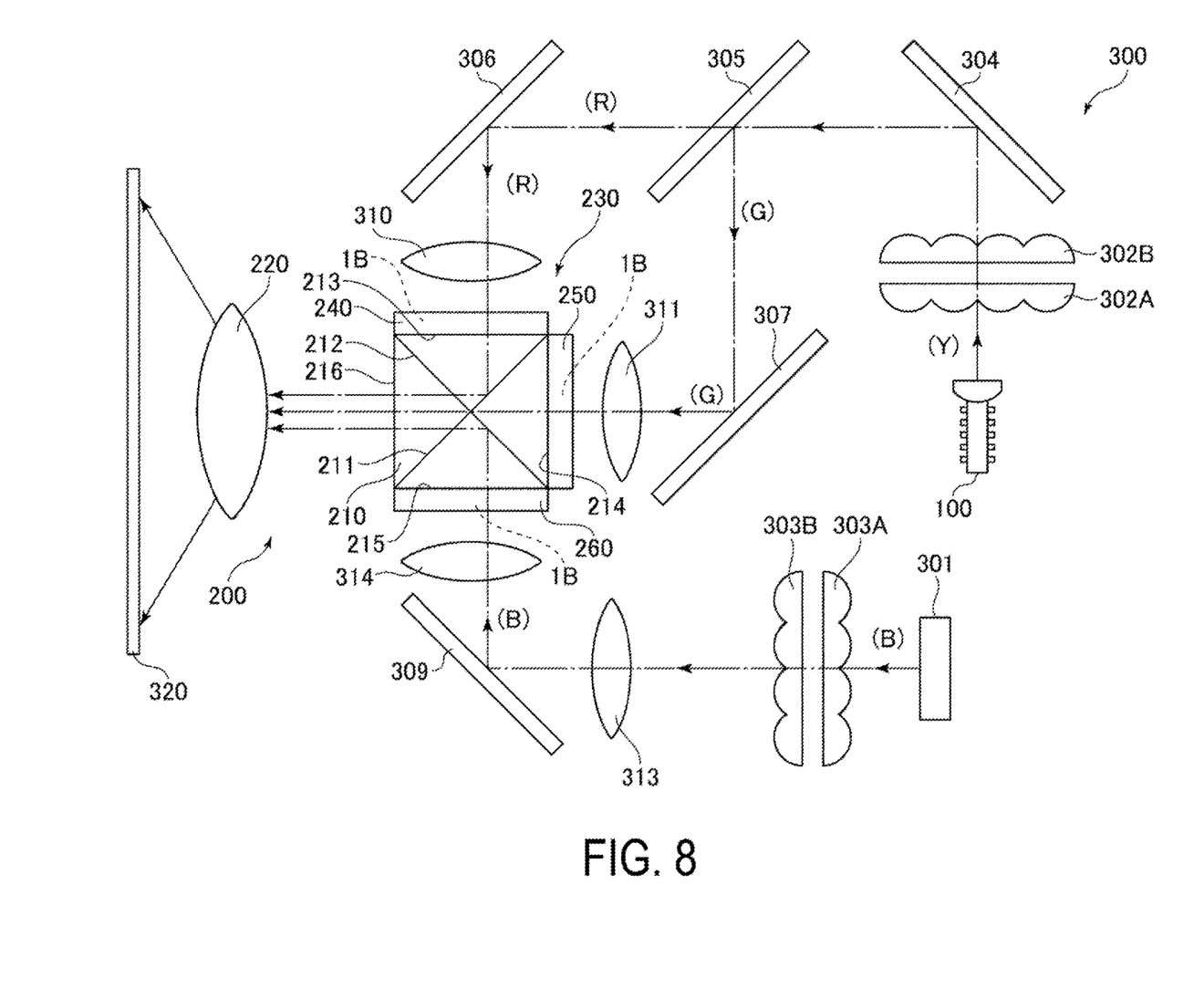
FIG. 8 is a diagram schematically illustrating an optical system of a liquid crystal projector to which an electronic apparatus of the present disclosure is applied.
Figure 9:
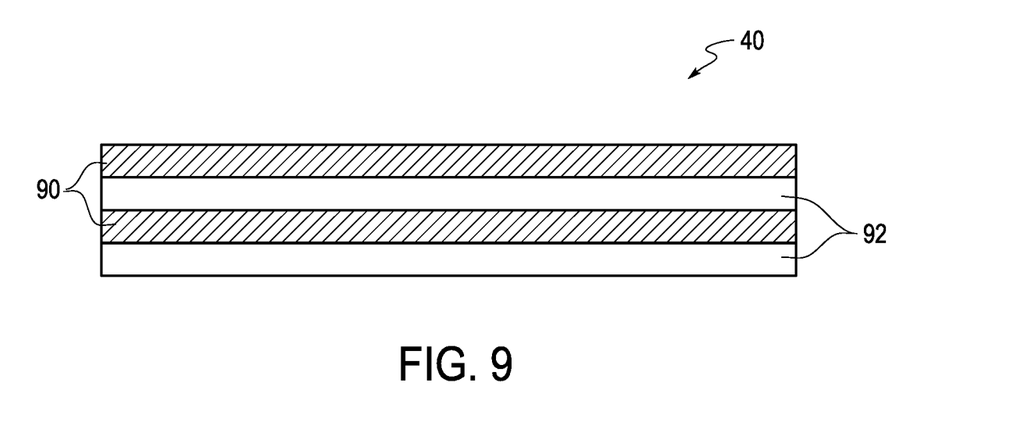
FIG. 9 is a cross-sectional view schematically illustrating details of the dichroic film of the embodiment of FIG. 1.

FIG. 8 is a diagram schematically illustrating an optical system of a liquid crystal projector to which the electronic apparatus of the present disclosure is applied.

As illustrated in FIG. 8, a liquid crystal projector 300 includes a light source 301 for emitting blue light, the light source device 100 for emitting yellow light as the second wavelength range light, an illumination optical system including a plurality of integrator lenses, a color separation optical system (light-guiding optical system) including a plurality of dichroic film mirrors or the like, a liquid crystal light valve 240 corresponding to a red color, a liquid crystal light valve 250 corresponding to a green color, a liquid crystal light valve 260 corresponding to a blue color, a dichroic film prism 210 formed with a dichroic film mirror surface 211 for selectively reflecting red light and a dichroic film mirror surface 212 for selectively reflecting blue light, and a projection lens 220, and is a liquid crystal projector using the three liquid crystal light valves.

Additionally, the illumination optical system includes integrator lenses 302A, 302B, 303A, and 303B. The color separation optical system includes mirrors 304, 306, 307, 309, a dichroic film mirror 305 that reflects blue light and green light, that is, selectively transmits red light, condensing lenses 310, 311, 313, and 314.

The liquid crystal light valve 250 includes a liquid crystal panel 1B. The liquid crystal light valves 240 and 260 are also constituted similarly to the liquid crystal light valve 250. The liquid crystal panel 1B included in each of the liquid crystal light valves 240, 250, and 260 is coupled to a driving circuit (not illustrated).

Note that, in the liquid crystal projector 300, an optical block 200 is constituted by the dichroic film prism 210 and the projection lens 220. Additionally, a display unit 230 is constituted by the optical block 200, the liquid crystal light valves 240, 250, and 260 fixedly installed at the dichroic film prism 210.

An operation of the liquid crystal projector 300 will be described below.

Yellow light emitted from the light source device 100 passes through the integrator lenses 302A and 302B. Light intensity or luminance distribution of this yellow light is made uniform by the integrator lenses 302A and 302B. Additionally, blue light emitted from the light source 301 passes through the integrator lenses 303A and 303B. Light intensity or luminance distribution of this blue light is made uniform by the integrator lenses 303A and 303B.

The yellow light passing through the integrator lenses 302A and 302B is reflected by the mirror 304 to a left side in FIG. 8, green light (G) of the reflected light is reflected by the dichroic film mirror 305 to a lower side in FIG. 8, and red light (R) passes through the dichroic film mirror 305.

The red light passing through the dichroic film mirror 305 is reflected by the mirror 306 to the lower side in FIG. 8, and the reflected light is shaped by the condensing lens 310, and enters the liquid crystal light valve 240 for red.

The green light reflected by the dichroic film mirror 305 is reflected by the mirror 307 to the left side in FIG. 8.

The green light reflected by the mirror 307 is shaped by the condensing lens 311, and enters the liquid crystal light valve 250 for green.

Additionally, the blue light passing through the integrator lenses 303A and 303B is directed to the left side in FIG. 8, and is reflected by the mirror 309 to an upper side in FIG. 8. The above blue light is shaped by the condensing lenses 313 and 314, and enters the liquid crystal light valve 260 for blue.

In this manner, the yellow light emitted from the light source device 100 is subjected to color separation into the red light and the green light by the color separation optical system, the red light and the green light are guided to enter the liquid crystal light valves 240 for red and 250 for green respectively, and the blue light emitted from the light source 301 is guided to enter the liquid crystal light valve 260 for blue.

At this time, each pixel of the liquid crystal panel 1B included in the liquid crystal light valve 240 is subjected to on/off switching control, that is, modulated, by a driving circuit that operates based on an image signal for red.

Similarly, the green light and the blue light enter the liquid crystal light valves 250 and 260, respectively, and are modulated by the respective liquid crystal panels 1B, thereby forming an image for green and an image for blue. At this time, each pixel of the liquid crystal panel 1B included in the liquid crystal light valve 250 is subjected to switching control by a driving circuit that operates based on an image signal for green, and each pixel of the liquid crystal panel 1B included in the liquid crystal light valve 260 is subjected to switching control by a driving circuit that operates based on an image signal for blue.

Accordingly, the red light, the green light, and the blue light are modulated by the liquid crystal light valves 240 250, and 260, respectively, and each of an image for red, the image for green, and the image for blue is formed.

The image for red formed by the liquid crystal light valve 240, that is, the red light from the liquid crystal light valve 240, enters the dichroic film prism 210 from a face 213, is reflected by the dichroic film mirror surface 211 to the left side in FIG. 8, passes through the dichroic film mirror surface 212, and is emitted from an emission surface 216.

Additionally, the image for green formed by the liquid crystal light valve 250, that is, the green light from the liquid crystal light valve 250, enters the dichroic film prism 210 from a face 214, passes through each of the dichroic film mirror surfaces 211 and 212, and is emitted from the emission surface 216.

Further, the image for blue formed by the liquid crystal light valve 260, that is, the blue light from the liquid crystal light valve 260, enters the dichroic film prism 210 from a face 215, is reflected by the dichroic film mirror surface 212 to the left side in FIG. 8, passes through the dichroic film mirror surface 211, and is emitted from the emission surface 216.

In this way, the light of the respective colors from the liquid crystal light valves 240, 250, or 260, that is, the respective images formed by the liquid crystal light valves 240, 250, and 260, are synthesized by the dichroic film prism 210, thereby forming a color image. This image is projected (enlarged and projected) by the projection lens 220, onto a screen 320 that is installed at a predetermined position.

Note that, the electronic apparatus of the present disclosure can also be applied, in addition to the liquid crystal projector having the configuration described above, to a DLP type liquid crystal projector including one Digital Micromirror Device (DMD). In other words, the light source device 100 can be used as a light source included in the DLP type liquid crystal projector.

Furthermore, the electronic apparatus according to the present disclosure can also be applied, in addition to the liquid crystal projector, to an electronic apparatus for which a liquid crystal projector such as a head-up display (HUD) or a head-mounted display (HMD) is applied. In addition, the light source device of the present disclosure can also be used as a light source for which directivity is required, such as automobile headlights, theater spotlights, and lighting devices used for illuminating buildings.

The light source device and the electronic apparatus in the present disclosure have been described above based on the illustrated exemplary embodiments, but the present disclosure is not limited thereto.

For example, in the light source device of the present disclosure, any of constitute elements may be replaced with any element capable of exhibiting similar functionality or an element in any configuration may be added.

In addition, in the light source device of the present disclosure, any two or more constitute elements described in the above-described first to fifth exemplary embodiments may be combined.

What is claimed is:

1. A light source device, comprising:
   a light-emitting body configured to emit first wavelength range light;
   a dielectric multilayer film including a plurality of high refractive index films and a plurality of low refractive index films, the low refractive index films each having lower refractive index than each of the high refractive index films;
   a wavelength converter that includes:
      an incident surface on which the first wavelength range light is incident; and
      an emission surface configured to emit the second wavelength range light after the first wavelength range light is converted to second wavelength range light, the incident surface being larger than the emission surface; and
   a light collector including a light collecting part configured to collect the second wavelength range light, wherein
   the plurality of high refractive index films and the plurality of low refractive index films are alternately stacked,
   in an emission direction of the first wavelength range light from the light-emitting body, the light-emitting body, the dielectric multilayer film, and the wavelength converter are stacked and directly bonded in order.

2. The light source device according to claim 1, wherein the light-emitting body, the dielectric multilayer film, and the wavelength converter are directly bonded via a bonding layer, and
a thickness of the bonding layer is equal to or less than one wavelength of a peak wavelength of the first wavelength range light.

3. The light source device according to claim 1, wherein the wavelength converter is larger than the light-emitting body in plan view viewed from the emission direction, and
the dielectric multilayer film is only formed between the light-emitting body and the wavelength converter.

4. The light source device according to claim 1, wherein the light-emitting body is a light-emitting diode.

5. The light source device according to claim 1, wherein the light-emitting body includes a substrate and a light-emitting element disposed at the substrate, and
the light-emitting body is bonded to the dielectric multilayer film with the substrate in contact with the dielectric multilayer film.

6. The light source device according to claim 1, wherein the light-emitting body includes a light-emitting element, and
the light-emitting body is bonded to the dielectric multilayer film with the light-emitting element in contact with the dielectric multilayer film.

7. An electronic apparatus, comprising:
the light source device according to claim 1.

8. The light source device according to claim 1, wherein a number of layers of the high refractive index films or the low refractive index films is 50 or less.

9. The light source device according to claim 1, wherein a number of layers of the high refractive index films or the low refractive index films is 5 or more.

10. The light source device according to claim 1, wherein a thickness of each of the high refractive index films is equal to or less than 500 nm, and
a thickness of each of the low refractive index films is equal to or less than 500 nm.

11. The light source device according to claim 1, wherein a thickness of each of the high refractive index films is equal to or more than 50 nm, and
a thickness of each of the low refractive index films is equal to or more than 50 nm.

* * * * *